United States Patent [19]
McMahan

[11] 3,763,442
[45] Oct. 2, 1973

[54] ION LASER PLASMA TUBE COOLING DEVICE AND METHOD

[75] Inventor: William H. McMahan, Winter Park, Fla.

[73] Assignee: American Laser Corporation, Winter Park, Fla.

[22] Filed: July 7, 1972

[21] Appl. No.: 269,799

[52] U.S. Cl. ........................................... 331/94.5 D
[51] Int. Cl. ............................................... H01s 3/02
[58] Field of Search .................................... 331/94.5

[56] References Cited
UNITED STATES PATENTS
3,427,564  2/1969  Okaya et al. ...................... 331/94.5
3,626,319  2/1971  Young ............................... 331/94.5
3,448,403  6/1969  Vislocky ........................... 331/94.5

Primary Examiner—William L. Sikes
Attorney—B. B. Olive

[57] ABSTRACT

A device and method for cooling an ion laser plasma tube are based on the utilization of a thermal conductor adapted to become fused to an ion laser plasma tube in such a manner as to efficiently transfer the heat generated to a surrounding cooling medium while mechanically adjusting to differential thermal expansion and contraction of the plasma tube.

2 Claims, 6 Drawing Figures

Patented Oct. 2, 1973 3,763,442
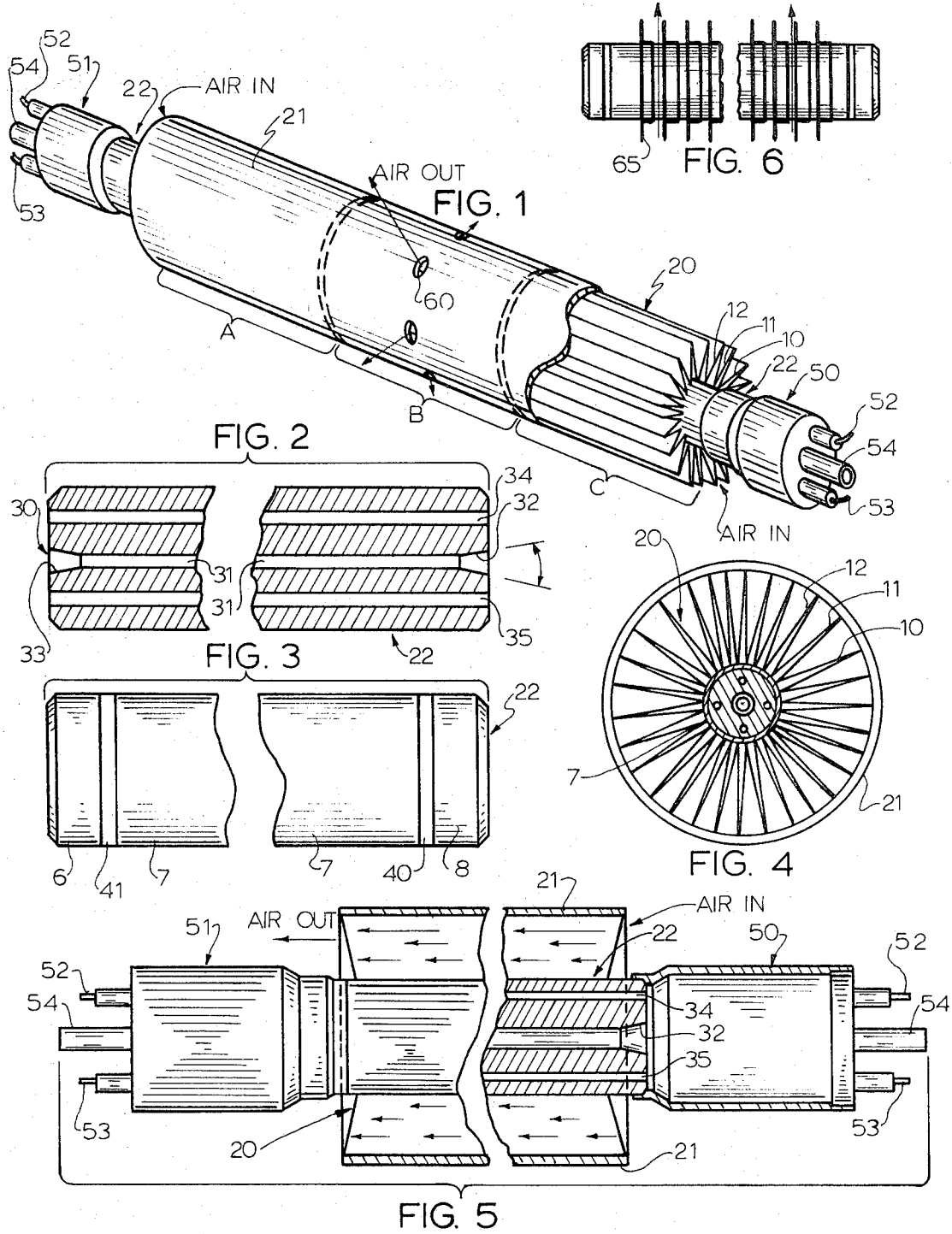

ION LASER PLASMA TUBE COOLING DEVICE AND METHOD

BACKGROUND OF THE INVENTION

1. Field of the Invention

The present invention relates to heat exchangers, cooling devices, and specifically to devices utilized to remove heat from plasma tubes during operation of an ion laser.

2. Description of the Prior Art

In the art of ion laser technology a gas discharge is employed to produce a medium having optical gain characteristics as is required for the production of laser radiation. A substantial amount of heat is generated during the discharge. The prior art has taught the use of liquid and air cooling means in order to dissipate this heat. In addition, differing styles of laser plasma tubes have received different heat removing treatments. In conventional ion lasers a plasma tube consists of a discharge bore, electrodes, a vacuum envelope and optical end windows. The discharge bore confines the gaseous plasma within a narrow elongated column so as to induce a high electrical density and to provide a long optical pathway. Two basic forms of discharge bore construction exist:

In the first form a discharge bore is made of a material which can provide a vacuum envelope along that portion of the plasma tube containing the bore, i.e., ceramic or quartz plasma tubes. In a second form of construction, the bore is fabricated of material ideally suited for use in confining the discharge plasma but which does not provide a suitable vacuum envelope, i.e., the anodic bore and segmented graphite plasma tubes. These bore constructions require the addition of a ceramic or quartz shell to provide an adequate vacuum.

Due to these and other technological limitations in bore construction, the prior art has been directed to the concept of placing a cooling medium in direct contact with the material comprising the vacuum envelope. Thus, the heat generated by the plasma discharge must be transferred to the cooling medium through the vacuum jacket in the vicinity of the discharge bore. Typically, a plasma tube section adjacent to the bore is immersed in water flowing parallel to the bore, or is subjected to a forced air stream being directed onto the exterior of the vacuum envelope by a fan. Conventional air cooled laser tubes, in particular, tend to heat excessively at the ends of the tubes.

Some of the most successful materials found to date for use in the construction of ion laser discharge bores have been ceramics. These ceramics have been characterized as having high thermal conductivity and good vacuum properties. One of the best types of ceramics is beryllium oxide, (BeO). However, BeO has a thermal conductivity which decreases rapidly with increased temperature. Consequently, a BeO plasma tube will experience a thermal run-away above (about 200° F.). Thus, there will be a failure if it is allowed to attain temperatures significantly above 200° F. Furthermore, BeO is a scarce and costly raw material and is highly expensive to form into complex configurations. Where other materials may take on forms significantly increasing the amount of surface area exposed to a cooling medium, thus increasing the rate of heat dissipation, BeO has been restricted to use in the form of a narrow cylinder concentric to the discharge bore. Conventionally cooled BeO plasma tubes have experienced low heat dissipation rates and frequent concomitant failures, rendering them unsuitable for prolonged use. BeO plasma tubes also do not lend themselves to being formed with fins of the same material even though wave guides and the like follow this practice.

It is evident from the above that there is clearly a need for an improved method and device which will adequately cool a laser discharge bore constructed of BeO or other ceramic material with like characteristics and in larger diameter tubes.

SUMMARY OF THE INVENTION

The apparatus and method of the present invention are directed to the use of a corrugated sleeve made of a good thermal conductor, which is adapted to become fused at appropriate points to an ion laser plasma tube. In order to effect the removal of heat from the tube during operation, the tube first receives a metal coating, then the corrugations, which run parallel to the length of the tube, are brazed or otherwise thermally fused, so as to effect cooling of the tube during operation, while enabling the sleeve corrugations to mechanically adjust to differential thermal expansion and contraction. Once attached, the corrugated sleeve effectively couples the heat being generated during operation to a surrounding cooling medium, i.e., air, water.

DESCRIPTION OF THE DRAWINGS

FIG. 1 is a perspective cutaway view of the invention apparatus situated about a conventional ion laser plasma tube.

FIG. 2 is a cross-section of a plasma tube revealing discharge bore construction.

FIG. 3 is a side view of a plasma tube showing detail of metallized portions.

FIG. 4 is a cross-section of a plasma tube showing the position of the corrugated members relative to the discharge bore.

FIG. 5 is a combination side view and cross-section view of an assembled plasma tube showing the position of the invention apparatus relative to the discharge bore end caps.

FIG. 6 is a side view of the plasma tube with an alternate disc type heat dissipation structure.

DESCRIPTION OF THE PREFERRED EMBODIMENT

Referring to FIG. 1, in a preferred embodiment the apparatus of the invention comprises a thin metal sheet formed by a series of corrugations 10, 11, 12, etc., into a finned structure 20 adapted to become fused to the circumference of a ceramic plasma tube 22 wherein the fins extend radially from the center of said tube and laterally along a portion of its length. A housing 21 surrounds the fins to contain a cooling medium. A conventional ceramic plasma tube 22, best shown in FIG. 2, commonly consists of an elongated cylindrical discharge bore 30 coaxially positioned within a ceramic cylinder. A hollow cylindrical longituidinal central bore 31 having tapered ends 32, 33 defines the plasma discharge path, that is, the path through which a discharge is produced. Auxiliary bores 34, 35 provide internal gas return pathways, while gases are admitted to the bore through a suitable inlet port (not shown).

Referring now to FIG. 3, a ceramic plasma tube 22 receives a thin metal coating along segments 6, 7 and 8. Gaps 40, 41 in the coating provide electrical insulation between segments 6 and 7; 7 and 8. The coating preferably consists of a base metallized, i.e., fired, coating of moly-manganese material 0.0005 to 0.001 inch thick on which there is electroplated a further nickel coating of 0.0001 inch thickness.

Metal corrugated fin members 10, 11, 12, etc., are fused to metal coating 7 along each length of contact. Note that brazing, welding or other fusing technique may be employed to attach the fin members so long as a good thermally conductive relationship is maintained between the plasma tube and the cooling apparatus. Although a rigid bond is formed between the ceramic and the fin material, no damage to the fin or to the ceramic is incurred, because the design and construction of the fin structure mechanically adjusts to the differential movement of the ceramic plasma tube during thermal cycling.

Referring now to FIG. 5, a plasma tube modified according to a method and apparatus of the invention is further fitted with end caps 50, 51 which contain electrodes 52, 53 optical pathway 54 and appropriate optical windows (not shown). End caps 50, 51 are brased around the circumference of tube 22 to metal coated portions 6 and 8, shown in FIG. 3, such that a vacuum envelope is formed throughout the tube. Insulated gaps 40 and 41, previously mentioned, prevent short circuiting of the electrodes. A cooling medium such as air is now directed along the tube, represented by arrows in FIG. 5, to effect the removal of heat from the ceramic tube. It is contemplated that while a fluid medium such as water could be used to obtain similar efficient results, the use of air effects a considerable savings in both the cost of installing and sealing a water jacket, and the added costs of the water consumed during operation. In previous water-cooled lasers utilizing ceramic plasma tubes water flow rates have been as high as three gallons per minute. An added advantage of the present invention is that the laser can now be operated at a location where water is not readily available.

A laser was built in accordance with this invention and was successfully operated. The plasma tube was constructed of Beryllium oxide having a bore assembly 3.5 inches long with 1.2 inches in outside diameter and 0.05 inch in inside diameter and as diagrammed in FIG. 2. The ceramic bore was metal coated and brazed at each end to metal assemblies which provided a vacuum envelope encompassing the electrode assemblies and which provided support for the optical windows. The exterior diameter of the ceramic tube received a metal coating over a length of three-sixteenths inch extending inwardly from each end, this surface being fused to the metal and assemblies. A length of the diameter of one-sixteenth inch inward of each end assembly was not metal coated in order to provide electrical insulation from the metal end assemblies. The remaining 3 inches of length received a metal coating, and became bonded to linear edges of the cooling fin assembly, which consisted of oxygen free copper foil of high thermal conduction to provide uniform heat dissipation throughout the assembly and was corrugated into a finned structure. A one inch wide foil strip was used and the finned structure was thus made up of three one inch wide and mating structures designated A, B and C in FIG. 1. A brazing alloy of high thermal conductivity was employed to provide maximum thermal coupling. The resulting cooling fin assembly had an inside diameter of 1.2 inches, an outside diameter of 3 inches, and a length of 3 inches. It had a surface area exposed to the air flow of approximately 200 square inches. Air flow was maintained within the assembly by means of a fan and suitable air ducts. Of special significance is the fact that a ceramic tube of much larger diameter than conventional may be employed and thus more surface area is available. For example, beryllium oxide tubes in the past have not exceeded ⅝ inch diameter whereas in the embodiment of the invention described above, the diameter is 1.2 inches.

It should also be noted that the copper and beryllium oxide have significantly different thermal expansion efficients. Although a rigid bond is formed between the ceramic and the fin material no damage to the ceramic or to the fin is incurred because the fin assembly is of a mechanical design and construction which along with the softness of the copper material provides for movement within the fin structure to accommodate the differential movement of the ceramic structure during thermal cycling. The most suitable material for the finned structure is oxygen free copper due to its moderate cost, ease of fabrication, softness and high termal conductivity. It is also suitable because it is easily brazed or soldered. Other materials may be brass, silver, or other metals, alloys, or ceramics.

A wide variety of physical configurations are applicable to the requirements of the invention. For example, a linear fin could be constructed in the form of a sheet with one edge bonded to the bore structure approximately parallel to the bore such that the fin would extend radially outward from the bore. A number of these assemblies could be bonded around the circumference of the bore to provide a cooling fin structure. Each fin could be individually bonded to the bore and designed with mechanical stress relief points along the length of the bond.

The corrugated fin assembly has previously been described. Obvious physical variations of the fin design described could be employed. For example, a practical modification of the cooling fin structure is that of using circular disc 65 whose interior circumferences may be bonded to the exterior plated surface of the tube. A number of these discs 65 bonded along the length of the bore could constitute the cooling fin assembly. Each fin may be individually bonded to the bore material and designed in such a manner that thermal stress relief around the circumference is achieved. FIG. 6 shows this disc type with transverse air flow.

It is apparent from the above that the apparatus and method of the present invention provide a means to effectively reduce the heat generated during ion laser discharge without requiring complex water jacket configurations, and in so doing provide a convenient and easily constructed means, at moderate cost, to insure the prolonged life of a ceramic plasma tube.

As previously mentioned, one of the problems experienced with prior art-cooled laser tubes has been the excessive heating of the tube ends. In this regard, it will be noted that FIG. 5 illustrates a straight flow through air pattern whereas in FIG. 1 the air is shown as being brought in from each end and centrally discharged through peripheral outlets 60 provided in the tube housing 21. Thus, where plasma tube end heating is a problem, the center discharge air flow pattern of FIG. 1 or the transverse air flow pattern of FIG. 6 is preferred.

I claim:

1. In an ion laser of the type having a plasma tube formed of a ceramic material characterized by exhibiting high thermal conductivity at ambient temperature and thermal failure when operated substantially above ambient and having a gas tight cylindrical cavity coaxially located within said tube, electrodes and conductor means connecting said tube with an appropriate electrical source, optical windows at end points of said cavity, an active gaseous mixture disposed within said cavity, inlet and exhaust means to control the flow of said gaseous mixture, and ignition means to energize the gaseous mixture within said cavity causing it to discharge, thereby emitting phased light through said optical windows, the improvement comprising:
   a. a metal coating on said ceramic tube covering all of a central major outer portion of said tube and spaced therefrom minor end outer portions for electrical connections thereto;
   b. a multi-finned metallic heat conducting structure fused to and circumferentially surrounding said central coated metal portion, said structure comprising a plurality of longitudinally extending fins formed by folded copper foil in corrugated-like form of substantially uniform thermal conductivity, said structure being divided longitudinally into a plurality of finned sections, each formed of said folded copper foil;
   c. air supply means adapted to vent cooling air over said structure and the fins thereof during operation of the laser to effect cooling of said tube ceramic material whereby the operating temperature thereof is maintained at a below thermal failure temperature; and
   d. a cylindrical housing member communicating with said air supply means and adapted to surround said finned structure and contain said cooling air during passage therethrough.

2. A laser as claimed in claim 1 wherein said air supply means is connected to provide said cooling air from each end of said tube and said housing member has central apertures to discharge the cooling air centrally of said tube.

* * * * *

UNITED STATES PATENT OFFICE
CERTIFICATE OF CORRECTION

Patent No. 3,763,442      Dated October 2, 1973

Inventor(s) William H. McMahan

It is certified that error appears in the above-identified patent and that said Letters Patent are hereby corrected as shown below:

In column 4, line 58, "art-cooled" should be -art air-cooled-.

Signed and sealed this 19th day of March 1974.

(SEAL)
Attest:

EDWARD M. FLETCHER, JR.
Attesting Officer

C. MARSHALL DANN
Commissioner of Patents